United States Patent
Arvidsson

(10) Patent No.: US 6,948,889 B2
(45) Date of Patent: Sep. 27, 2005

(54) TOOL AND CUTTING INSERT FOR CHIP REMOVING MACHINING

(75) Inventor: Peder Arvidsson, Gävle (SE)

(73) Assignee: Sandvik Aktiebolag, Sandviken (SE)

( * ) Notice: Subject to any disclaimer, the term of this patent is extended or adjusted under 35 U.S.C. 154(b) by 0 days.

(21) Appl. No.: 10/392,898

(22) Filed: Mar. 21, 2003

(65) Prior Publication Data

US 2003/0210961 A1 Nov. 13, 2003

(30) Foreign Application Priority Data

Mar. 21, 2002 (SE) .............................................. 0200867

(51) Int. Cl.[7] .............................................. B23B 27/16
(52) U.S. Cl. ........................ 407/35; 467/67; 467/113
(58) Field of Search ............................ 407/66, 33, 36, 407/39, 44, 114, 113, 67, 35

(56) References Cited

U.S. PATENT DOCUMENTS

| 4,059,363 A | * 11/1977 | Romagnolo ................. 407/114 |
|---|---|---|
| 4,682,916 A | 7/1987 | Briese |
| 4,709,737 A | * 12/1987 | Jonsson ...................... 144/241 |
| 5,810,518 A | * 9/1998 | Wiman et al. .............. 407/102 |
| 5,820,310 A | 10/1998 | Boianjiu |
| 5,924,826 A | * 7/1999 | Bystrom et al. ............ 407/103 |
| 6,164,878 A | 12/2000 | Satran et al. |

FOREIGN PATENT DOCUMENTS

DE           297 23 558 U1    12/1998

* cited by examiner

Primary Examiner—Willmon Fridie, Jr.
(74) Attorney, Agent, or Firm—Burns, Doane, Swecker & Mathis, L.L.P.

(57) ABSTRACT

A tool intended for chip removing machining includes a holder and a cutting insert which have respective connecting surfaces arranged to engage each other and define an interface. A ridge having a tapering cross-sectional shape is formed in one of the connecting surfaces, and a groove having a tapering cross-sectional shape is formed in the other connecting surface, which groove receives the ridge. Both of the ridge and groove are in the shape of curves as viewed in a direction perpendicular to the respective connecting surface. The curve shape may be circular, elliptical, or polygonal.

30 Claims, 3 Drawing Sheets

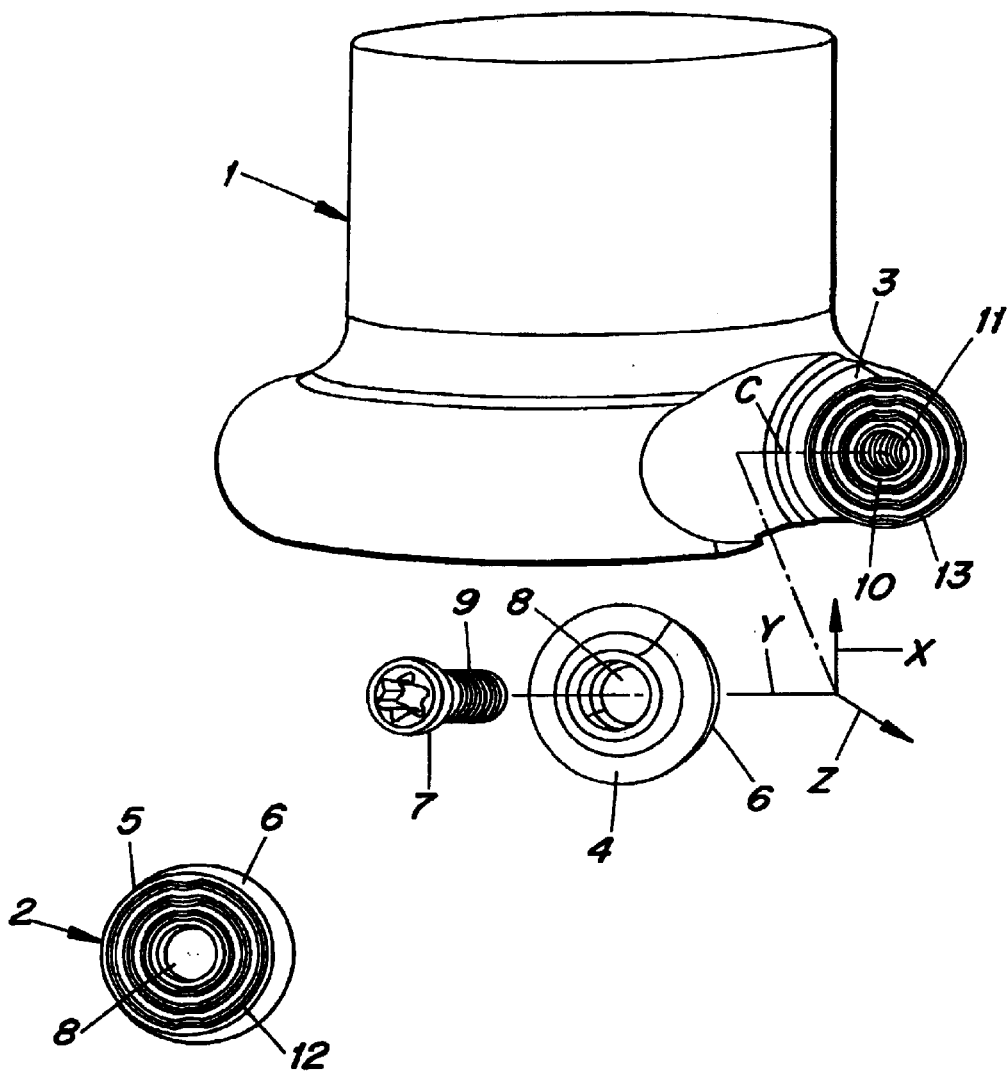
Fig. 1
Fig. 1A
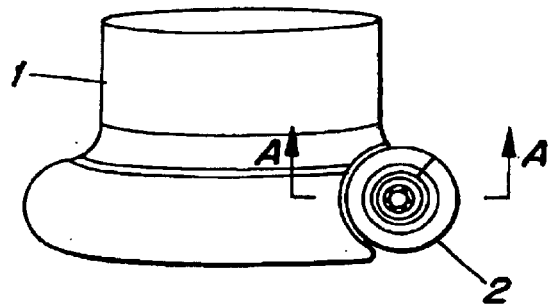
Fig. 2

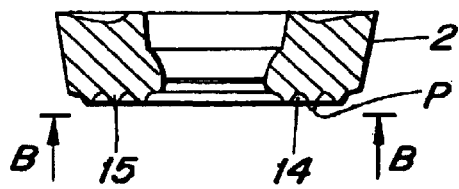
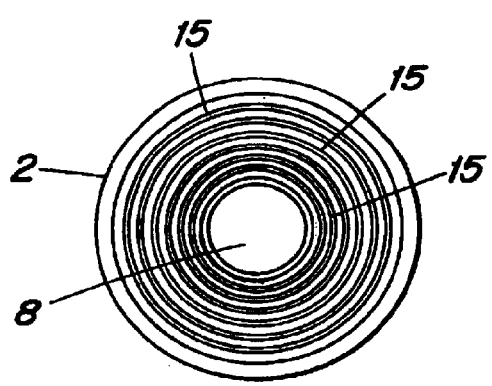
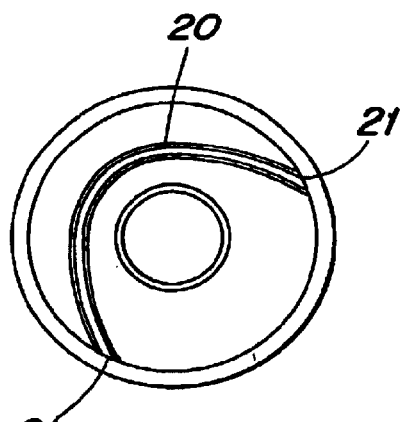
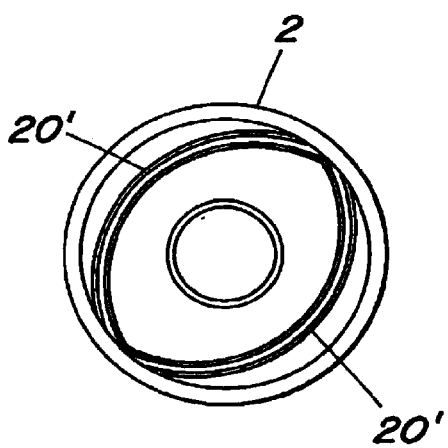
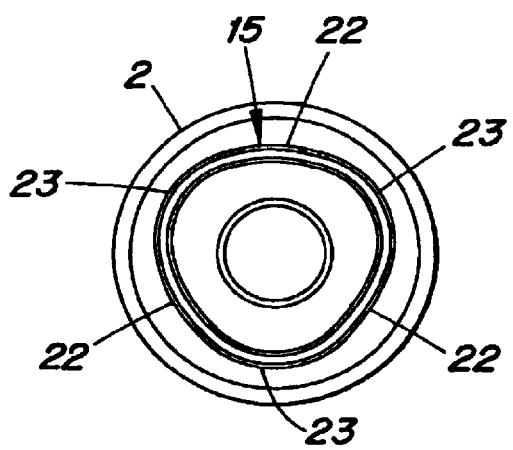

TOOL AND CUTTING INSERT FOR CHIP REMOVING MACHINING

This application claims priority under 35 U.S.C. § 119 to Patent Application Serial No. 0200867-0 filed in Sweden on Mar. 21, 2002, the entire content of which is hereby incorporated by reference.

TECHNICAL FIELD OF THE INVENTION

In a first aspect, this invention relates to a tool intended for chip removing machining of the type that comprises two parts, such as a basic body and a cutting insert, which have connecting surfaces arranged to engage each other.

PRIOR ART

Tools of the above generally mentioned kind are usually used for machining workpieces of metal, such as steel, aluminum, titanium, etc. The basic body or holder of the tools may either be fixedly mounted, e.g. for turning purposes, or movable, e.g. rotatable for milling or drilling purposes. The cutting body constitutes an expendable material having a considerably shorter service life than the basic body and is, therefore, detachably connected to the basic body in order to enable exchange. Depending on the field of use, the cutting insert may be of highly varying shapes. A frequently occurring form of cutting inserts consists of flat and polygonal or round bodies of the type that has a top side, at least one peripheral side surface or circumferential surface, and a bottom side, whereby one or more cutting edges are formed in the transition between the top side and the circumferential surface. Other cutting inserts may consist of rotatable bodies of the type that has a rotationally symmetrical envelope surface on which cutting edges are formed. Such cutting inserts are found, for instance, in drills, shank-type cutters and the like.

It has always been an ambition to connect the cutting insert to the basic body in a way that is as stable and reliable as possible. Previously, the conventional, flat cutting inserts were without exception formed with a smooth bottom side, whereby the cutting inserts were mounted in seatings or so-called insert seats, having on the one hand a plane bottom against which the bottom side of the cutting insert are pressed, and on the other hand one or more side walls against which the side surfaces of the cutting inserts are pressed. Recently, the use of interacting, ridge-provided connecting surfaces or so-called ridge teeth has, however, found favor in the tool industry.

In the patent literature, various embodiments of interacting, ridge-provided connecting surfaces are fairly richly described. See, for instance, U.S. Pat. No. 6,102,630 (Tool Flo Manufacturing Inc), WO99/19104 corresponding to U.S. Pat. No. 6,004,080 (Sandvik AB), WO99/19105 corresponding to U.S. Pat. No. 6,086,290 (Sandvik AB), WO97/16276 corresponding to U.S. Pat. No. 5,800,079 (Sandvik AB), Swedish Patent 509,540 corresponding to U.S. Pat. No. 6,146,060 (Seco Tools AB), Australian Patent 213,925 (Stanislas Kryszek) and U.S. Pat. No. 5,810,518 (Sandvik AB). In the tools that are known from these patent publications, each one of the two interacting connecting surfaces includes a plurality of long narrow ridges, spaced-apart by grooves, that are straight and parallel and usually of a trapezoid-like cross-sectional shape. Ridges formed with plane or smooth flank surfaces that form an angle of approximately 60° to each other are the most common type. Furthermore, characteristic of connecting surfaces or interfaces of the type in question is that the peaks or apexes of the ridges do not touch the bottom in the appurtenant grooves. In this way, it is guaranteed that only the flank surfaces of the ridges are pressed against each other, whereby the ridges are wedged up in each other.

Connecting surfaces of the type related to above offer a very good grip or good clamping of the cutting insert with respect to forces that act at an angle to the ridges. However, the ridges do not offer any clamping effect in respect to forces that act parallel with the ridges, as a consequence of the straight basic shape thereof. This means that the fixing of the cutting insert in the direction parallel to the ridges becomes dependent on other support surfaces, e.g. such support surfaces formed in the insert seat against which the side surfaces of the cutting inserts are pressed. In practice, this may result in poor precision in respect to the exact position of the cutting insert, and the cutting insert risks being dislodged.

OBJECTS AND FEATURES OF THE INVENTION

In a first aspect, the present invention aims at obviating the above-mentioned drawback of previously known cutting tools and at providing an improved cutting tool. Therefore, a primary object of the invention is to provide a tool in which the connecting surfaces of the basic body and the cutting insert ensure a reliable fixing of the cutting insert in the desired position in a simple and efficient way. More precisely, the connecting surfaces should already ensure an exact location of the cutting insert in all three directions in a conceived system of coordinates without other measures than the cutting insert being pressed in one of said co-ordinate directions. In other words, it should be possible to fix the cutting insert tightly in the x direction as well as the z direction solely through clamping in the y direction, all with the purpose of making every form of a separate support towards the side surface or side surfaces of the cutting insert unnecessary.

SUMMARY OF THE INVENTION

According to the invention, at least the primary object is attained by a tool for chip removing machining which comprises first and second parts having respective first and second connecting surfaces arranged to engage each other. A ridge having a tapering cross-section is formed in one of the connecting surfaces. A groove having a tapering cross-section is formed in the second connecting surface, and receives the ridge. Both the ridge and the groove are of curved shape as viewed in a direction perpendicular to the respective connecting surface.

In a second aspect, the invention aims at providing a cutting insert that can be fixed in a stable way in an appurtenant basic body or shim plate. The cutting insert, being adapted for chip removing machining, comprises a connecting surface for interaction with an analogous connecting surface in a tool part. The connecting surface comprises a ridge having a tapering cross-section which is in the form of a curve as viewed in a direction perpendicular to the connecting surface.

By forming the interacting ridges and grooves in the basic body and the connecting surfaces of the cutting insert, respectively, in the form of curves in accordance with the invention, the advantage that the cutting insert cannot move in either the x direction or the z direction, of a conceived system of co-ordinates as soon as the cutting insert is held in place by means of a tensile force acting in the y direction.

BRIEF DESCRIPTION OF THE DRAWINGS

The objects and advantages of the invention will become apparent from the following detailed description of preferred embodiments thereof in connection with the accompanying drawings, in which like numerals designate like elements, and in which FIG. 1 is an exploded front view in perspective illustrating a rotatable basic body and a cutting insert separated from the same that are formed with connecting surfaces according to the invention.

FIG. 1A is a rear perspective view of the cutting insert.

FIG. 2 is a side view of the basic body with a mounted cutting insert.

FIG. 7 is a cross-section through solely one cutting insert according to the invention.

FIGS. 8–11 are planar views from below (along line B—B in FIG. 7) of four different respective alternative embodiments of connecting surfaces on the bottom side of cutting inserts.

DESCRIPTION OF PREFERRED EMBODIMENTS OF THE INVENTION

Figure 4:
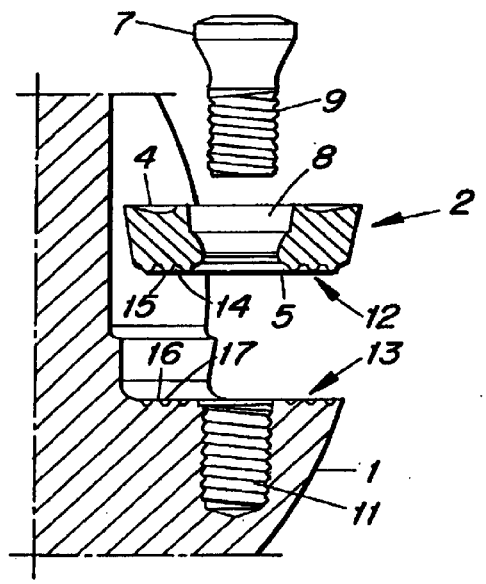
FIG. 4 is a section corresponding to FIG. 3, showing the cutting insert along with a clamping screw distanced from the insert seat of the basic body.

In FIGS. 1–4, a tool intended for chip forming or chip removing machining is shown, comprising a basic body or holder 1 and a detachable cutting insert 2. In the example, the basic body is assumed to be rotatable and consists of a cutter head. Seatings or so-called insert seats 3 are formed on the periphery of the basic body, only one of which being shown in FIG. 1. In the chosen embodiment example, the cutting insert 2 is round. More precisely, the cutting insert is defined by a top side 4, a bottom side 5, as well as an endless peripheral side surface 6 having a rotationally symmetrical shape. However, it should be pointed out that the cutting insert may have any basic shape, in particular polygonal, such as triangular, square, rectangular, rhomboidal or the like. The material of the cutting insert 2 should be hard and wear-resistant. For instance, the cutting insert may be made of conventional cemented carbide, ceramics or the like. The basic body 1, however, may be manufactured from a more elastic or soft material, such as steel or the like.

The cutting insert may be mounted and clamped in the insert seat 3 in various ways. In the shown example, the cutting insert is mounted by means of a conventional clamping screw 7, which may be inserted through a central hole 8 in the cutting insert and tightened with the male thread 9 thereof in a female thread 10 in a central hole 11 in a part in which the insert seat 3 is formed projecting from the basic body.

A first connecting surface 12 is defined by the bottom side 5 of the cutting insert 2, which is arranged to interact with a second connecting surface 13 defined by the insert seat 3. In the example, the first connecting surface 12 includes a plurality of ridges 15, spaced-apart by grooves 14, which individually in a known way have a cross-section-wise tapering basic shape. More precisely, the individual ridge 15 tapers in the direction downwards from the cutting insert and away from the top side 4, while the surrounding grooves 14 taper in the direction upwards toward the top side 4. In an analogous way, the second connecting surface 13 includes a plurality of ridges 16, which are spaced-apart by grooves 17. The cross-section shape of the individual ridge 16 tapers in the direction upwards, toward the top side 4, while the individual groove 17 tapers cross-section-wise in the direction downwards away from the top side 4.

Figure 3:
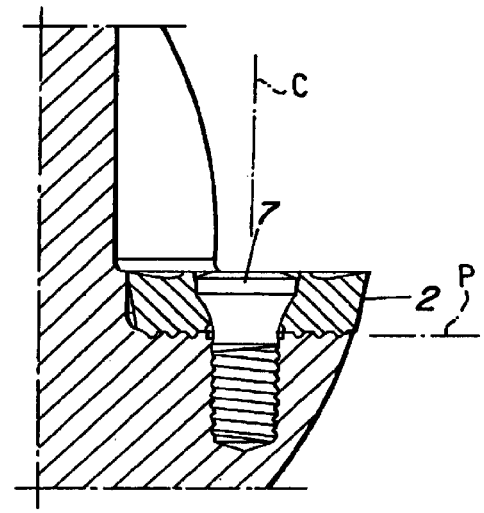
FIG. 3 is an enlarged detailed section along line A—A in FIG. 2.

In FIG. 1, C designates a geometrical center axis passing through the top and bottom sides 4, 5 and through the holes 8, 11. As can be seen in FIG. 3, the ridges and the grooves 14–17 lie in a plane P oriented perpendicularly to the center axis C of the insert, which axis C passes through the top and bottom sides 4, 5 of the insert.

In previously known tools, the above-mentioned ridges and grooves, respectively, in the two interacting connecting surfaces have been of a straight shape. Contrary to this, the ridges and grooves of the connecting surfaces in the tool according to the invention have in the geometrical respect generally the shape of curves, wherein the curvature is visible when looking at the ridge or groove in a direction perpendicular to the plane P (e.g., as viewed in FIGS. 8–11). As will be seen from the description below, said curves may either be closed, i.e. endless, or they can be finite.

In the example according to FIGS. 1–4 (see also FIGS. 7 and 8), the two connecting surfaces 12, 13 include a plurality of ridges, spaced-apart by grooves. More precisely, each one of the connecting surfaces 12, 13 includes three ridges 15 and 16, respectively, having the form of closed, rotationally symmetrical or circular curves. Said circles are of different diameters with reference to the axis C in that the individual circle has a smaller diameter than each circle positioned outside thereof. The innermost ridge of the cutting insert 2 has the same diameter as the innermost groove in the connecting surface of the insert seat, and then the outer ridge in the connecting surface of the insert seat has the same diameter as the outer groove in the connecting surface of the cutting insert, etc.

It is to advantage, but not necessary, that each individual connecting surface 12 and 13, respectively, is plane in so far that the peaks of all ridges 15 and 16, respectively, are positioned in a common plane. Each individual ridge may extend continuously along the entire curved extension thereof, although it is also feasible, per se, to form the same with one or more breaks, i.e., the ridge could be interrupted. Thus, within the scope of the invention, it is feasible to form a ridge suitable for engagement with a groove, the ridge formed of a plurality of studs or projections following each other, between which there are spaces. However, the ridge is most suitably of a uniform thickness, continuous and has one and the same cross-section shape along the entire curved extension thereof. In an analogous way, the individual groove advantageously has one and the same depth and one and the same cross-section shape along the entire curved extension thereof.

In this connection, it should be pointed out that the connecting surfaces may be formed with means of locking the cutting insert rotation-wise in relation to the basic body. Such a means could consist of a projection P (see FIG. 7), formed on a ridge that in other respects is of a uniform thickness, which projection may engage in a countersink of the same shape formed in a bottom of a groove. When the projection engages the countersink, turning of the cutting insert in relation to the insert seat is made impossible.

FIGS. 3 and 4 illustrate how the cutting insert 2 may be clamped in the insert seat by means of the clamping screw 7. When the screw is tightened, a single compressive force is applied to the cutting insert, which in a conceived three-dimensional system of coordinates acts along the y-axis of the system, whereby the cutting insert in a fixed state is locked immovably against forces acting along the x-axis and z-axis of the coordinate system. In other words, the interface between the cutting insert and the basic body guarantees an exact location of the cutting insert in three dimensions solely thanks to the cutting insert being pressed in one single axial direction, viz by means of the screw, which forces the cutting insert straight down onto the insert seat while wedging the ridges of the connecting surfaces in the appurtenant grooves. Thus, the interface between the cutting insert and the insert seat is pressed only by compression forces and, therefore, resists very high loads.

Figure 5:
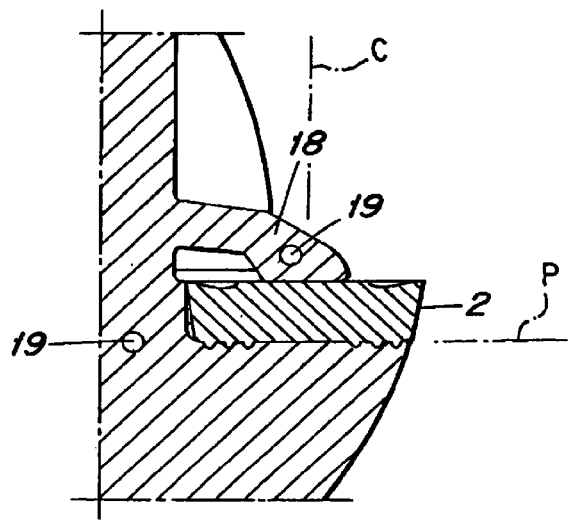
FIG. 5 is a detailed section showing an alternative way to clamp the cutting insert in the insert seat.
Figure 6:
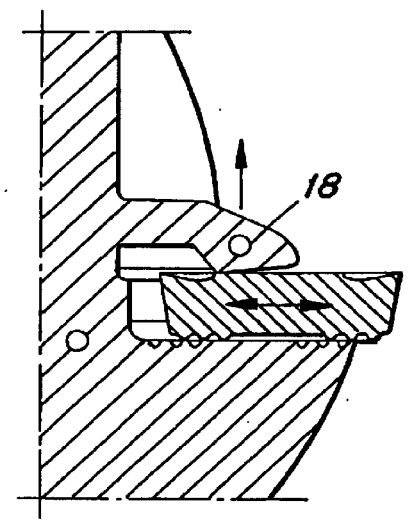
FIG. 6 is a section corresponding to FIG. 5, showing the cutting insert in a state distanced from the insert seat.

In FIGS. 5 and 6, another way of fixing the cutting insert in the insert seat is exemplified. Instead of a screw, a clamp 18 is utilized in this case, which through inherent elasticity of the material has the ability to clamp the cutting insert in the insert seat, as is shown in FIG. 5. The clamp 18 may be displaced away from the insert seat by means of a key (not shown) having pins that are inserted into holes 19 in the basic body and the clamp, respectively, in order to turn the clamp upwards in the direction of the arrow in FIG. 6, and thereby enable mounting and dismounting, respectively, of the cutting insert.

In FIG. 9, an alternative embodiment of the invention is shown. In this case, the bottom surface of the cutting insert includes 1 one single curve-shaped ridge 20, extending between ends 21. The shape of said ridge may be arbitrary, provided that the same is not circular or linear, respectively. The ridge is arranged to engage in a groove, formed in the insert seat, which groove forms the connecting surface of the insert seat and which has same shape as the ridge 20. Advantageously, the ridge and the groove are substantially of equal-length curvature, although it is also feasible to form the groove with a greater length than the ridge.

In FIG. 10, another alternative embodiment is shown, according to which the cutting insert has two finite, curve-shaped ridges 20'. Also in this case, the curve-shape may be non-circular. It is in this case even feasible to make the curves partially circular, provided that the circle-shape is not concentrical to the center of the cutting insert. In this way, it is guaranteed that the cutting insert cannot twist in relation to the insert seat.

In FIG. 11, an additional example of a ridge 15' having a closed curve shape is shown. In this case, the ridge has the shape of a polygon, more precisely a polygon that is defined by three arc-shaped sides 22, that transform into each other via rounded corners 23 (having smaller arc radii than the sides 22).

Advantages of the Invention

A primary advantage of the invention is that the cutting insert (or another part of a tool) may be coupled together and fixed in relation to a basic body by means of the simple measure of applying a compressive force in one single direction (along the y-axis of the system of coordinates) to the cutting insert, whereby the cutting insert obtains a very exact location at a given point in the system of coordinates. In other words, the connecting surfaces according to the invention provide an automatic positional determination of the center of the cutting insert at the origin of the system of coordinates without the assistance of any support surfaces whatsoever towards the side surface of the cutting insert. In practice, this means that such support surfaces in the insert seat may be dispensed with; something which facilitates the manufacture of the tool to a large extent. In addition to this, the interface between the cutting insert and the basic body formed by the two connecting surfaces resists very high loads in arbitrary loading directions.

Feasible Modifications of the Invention

The invention is not limited solely to the embodiments described above and exemplified in the drawings. Thus, the invention is applicable not only to milling cutters but also to other arbitrary cutting tools, such as turning tools, drilling tools, etc. Furthermore, the connecting surfaces do not necessarily need to be present on precisely a cutting insert and a basic body. Thus, the connecting surfaces may be included in interfaces between two or more parts, e.g. extension parts that together form a basic body. It is also feasible to form connecting surfaces of the type in question in shim plates of the type that may be found between a cutting insert and a basic body. It should furthermore be pointed out that the curve shape of the ridges and the grooves, respectively, may vary most considerably. The same may for instance have another closed curve shape than precisely a circular and polygon-like, respectively, e.g. elliptical. Furthermore, the invention provides possibilities to clamp the cutting insert in the insert seat in another way than by means of screws and clamps. For instance, the cutting insert may be clamped in a magnetic way, e.g. by means of a magnet, sintered into the bottom of the cutting insert, which is actuable by an electromagnet adjacent to the insert seat in the basic body. It is also feasible to clamp the cutting insert by means of vacuum, e.g. by a negative pressure being creating in a small hollow space in the bottom side of the cutting insert by means of a device placed in the insert seat, which device evacuates air from the hollow space, e.g. a screw having a dense thread. As has been pointed out initially, the cutting insert may have another shape than precisely circular, as is shown in the embodiment examples. For instance, the cutting inserts may be square, rectangular, rhomboidal, triangular or the like.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. Tool for chip removing machining, comprising first and second parts, the first part including a top cutting side, a bottom side disposed opposite the top cutting side, and a peripheral side surface extending between the top and bottom sides; the second part including a seat on which the bottom side is mounted, wherein the bottom side and the seat define respective first and second connecting surfaces arranged to engage each other; a ridge formed on one of the connecting surfaces and a groove formed in the other connecting surface, the groove receiving the ridge such that the groove and the ridge lie substantially in a plane oriented perpendicularly to a center axis of the first part, which center axis passes through the top and bottom sides; the ridge and the groove being tapered in a direction away from the top cutting side; each of the ridge and the groove being of curved shape within the plane, wherein the curvature of the ridge and the groove is visible when the ridge and the groove are viewed in a direction perpendicular to the plane.

2. The tool according to claim 1 wherein the first and second parts comprise a holder and a cutting insert, respectively.

3. Tool according to claim 2, wherein the ridge and the groove are substantially equally long along their curvature.

4. Tool according to claim 2, wherein each of the ridge and groove forms an endless curve within the plane.

5. Tool according to claim 4, wherein the first connecting surface includes a plurality of first ridges, spaced-apart by grooves, which ridges are of different sizes and arranged to engage in a corresponding number of grooves formed between second ridges in the second connecting surface.

6. Tool according to claim 5, wherein each ridge and groove is symmetrical about a common center axis.

7. Tool according to claim 4, wherein each ridge and groove is elliptical.

8. Tool according to of claim 4, wherein each ridge and groove is of polygonal shape.

9. Tool according to claim 8, wherein the polygonal shape is defined by three arched sides that transform into each other via rounded corners.

10. Tool according to claim 4, wherein the ridge extends continuously along the entire curved extension thereof.

11. Tool according to preceding claim 1, wherein the ridge is of uniform thickness along the entire curved extension thereof.

12. Tool according to claim 1, wherein the groove has a constant depth along the entire curved extension thereof.

13. Tool according to claim 2, wherein the connecting surfaces include means locking the cutting insert against rotation relative to the holder about the center axis.

14. Cutting insert according to claim 2, wherein the ridge is endless within the plane.

15. Cutting insert according to claim 2, wherein the connecting surface includes a plurality of ridges of different sizes spaced-apart by grooves.

16. Cutting insert according to claim 14, wherein the endless ridge is rotationally symmetrical about a the center axis.

17. Cutting insert according to claim 14, wherein the endless ridge is elliptical.

18. Cutting insert according to claim 14, wherein the endless ridge is in the form of a polygon.

19. Cutting insert according to claim 18, wherein the polygon is defined by three arched sides that transform into each other via rounded corners.

20. Cutting insert according claim 14, wherein the ridge has a constant height along the entire curved extension thereof.

21. Cutting insert according to claim 14, wherein the ridge is of uniform thickness along the entire curved extension thereof.

22. Cutting insert for chip removing machining, comprising a body having a top cutting side, a bottom side disposed opposite the top side, and a peripheral side surface extending between the top and bottom sides, the bottom side defining a connecting surface adapted for interaction with an analogous connecting surface in a tool part, wherein the connecting surface comprises a groove tapered in a direction toward the top side; the groove lying substantially in a plane oriented perpendicularly to a center axis of the body which center axis passes through the top and bottom sides, the groove being of curved shape within the plane wherein the curvature of the groove is visible when the ridge is viewed in a direction perpendicular to the plane.

23. Cutting insert according to claim 22, wherein the groove is endless within the plane.

24. Cutting insert according to claim 22, wherein the connecting surface includes a plurality of grooves of different sizes spaced-apart by ridges.

25. Cutting insert according to claim 23, wherein the endless groove is rotationally symmetrical about the center axis.

26. Cutting insert according to claim 23, wherein the endless groove is elliptical.

27. Cutting insert according to claim 23, wherein the endless groove is in the form of a polygon.

28. Cutting insert according to claim 27, wherein the polygon is defined by three arched sides that transform into each other via rounded corners.

29. Cutting insert according to claim 23, wherein the groove has a constant depth along the entire curved extension thereof.

30. Cutting insert for chip removing machining, comprising a body having a top cutting side, a bottom side disposed opposite the top side, and a peripheral side surface extending between the top and bottom sides, the bottom side defining a connecting surface adapted for interaction with an analogous connecting surface in a tool part, wherein the connecting surface comprises a ridge tapered in a direction away from the top side; the ridge lying substantially in a plane oriented perpendicularly to a center axis of the body which center axis passes through the top and bottom sides, the ridge being of curved shape within the plane wherein the curvature of the ridge is visible when the ridge is viewed in a direction perpendicular to the plane.

* * * * *